United States Patent [19]

Cottrell et al.

[11] 3,965,680

[45] June 29, 1976

[54] HYDROKINETIC DEVICE

[75] Inventors: Harold L. Cottrell, Kansas City, Mo.; Anthony C. Mamo, Arlington Heights, Ill.

[73] Assignee: Power Control, Inc., Chicago, Ill.

[22] Filed: Jan. 14, 1975

[21] Appl. No.: 540,837

[52] U.S. Cl. .................................. 60/357; 60/358; 60/364; 60/367
[51] Int. Cl.² ......................................... F16D 33/06
[58] Field of Search ............ 60/338, 347, 352, 357, 60/358, 364, 367

[56] References Cited
UNITED STATES PATENTS

| | | | |
|---|---|---|---|
| 1,860,701 | 5/1932 | Bauer et al. | 60/338 |
| 3,055,169 | 9/1962 | Seibold et al. | 60/357 X |
| 3,347,042 | 10/1967 | Horsch | 60/358 X |

*Primary Examiner*—Edgar W. Geoghegan
*Attorney, Agent, or Firm*—Thomas R. Juettner

[57] ABSTRACT

A hydrokinetic device comprising a fluid containing housing and unique relatively rotatable wheel means, including an impeller wheel connected to an input shaft and a turbine wheel connected to an output shaft. With the addition of a stator wheel the device may provide torque multiplication between the shafts, or without the stator may be used to couple the shafts together. The wheel means is sized and arranged so that in one sequential pair of wheels the entrance edge of one of the wheels is spaced apart from the exit edge of the adjacent wheel a distance generally equal to or greater than the smallest maximum width of one of the wheels, and so that the heads generated by rotation of the wheels are predominantly additive and do not cause potentially destructive negative counter heads opposing the impeller flow. The conical configuration of wheel means with parallel edges especially lends itself to achieving such desired arrangement. Thus, the present hydrokinetic device prevents the generation of the destructive instability associated with hydrokinetic torque multipliers operated at variable fill, is capable of quickly being emptied and filled to achieve hydraulic neutral, and may be operated at various levels to achieve variable power absorbing and transmitting capacity.

28 Claims, 6 Drawing Figures

3,965,680

HYDROKINETIC DEVICE

FIELD OF INVENTION

This invention relates to hydrokinetic devices and, more particularly, to devices such as torque converters and fluid couplings.

A prior art hydrokinetic device of one of these types generally comprised a fluid containing body and turbine and impeller wheels, and if of the torque multiplier type, also a stator wheel; all are mounted for rotation in the body. The impeller and turbine were usually symetrically opposed to each other so that when they rotate, the turbine and impeller develop and cause opposing heads which in certain conditions, particularly at transient and partial fill fluid levels, caused counter flow from the turbine toward the impeller, thus opposing the normal fluid flow from the impeller to the turbine. This counter flow could cause severe shock loads (torque pulsations 10–17 times greater than the input torque) to be imposed on the entire structure and often could cause destruction of the device. Thus, torque multiplying prior art devices were never emptied and filled while fluid couplings were filled or emptied very slowly over a period of minutes and then only within specified ranges. Such time limitations made it impossible to achieve hydraulic neutral or variable capacity by draining the device, except for stationary, marine or railroad applications where such long "shift" times could be tolerated. Certainly, such devices could not be used in any vehicular applications, such as off-the-road equipment, farm tractors, trucks, buses or passenger automobiles.

A fluid coupling has no torque multiplication ability while a torque converter does, but both prior art fluid couplings and torque converters, unless of very expensive, complicated and costly to maintain designs, such as using variable pitch wheels, have only limited or fixed power capacity, i.e., the ability of the device to absorb or transmit power from one wheel to the other. An economical, inexpensive and uncomplicated variable power capacity hydrokinetic device has long been sought, particularly in torque converters, but heretofore has not been obtained. The unavailability of such device requires considerable time and expense in matching present devices, with their fixed power capacity, to prime movers or to its task. Many different size prior art torque converters are needed for a given range of prime movers.

In addition, in off-the-road applications a highly skilled operator is needed to maintain proper operation of a vehicle equipped with a prior art torque converter because of its fixed power capacity. For example, a highly skilled operator is needed for a prior art torque converter equipped bulldozer during a bucket loading operation since a close balance must be maintained between the power transferred in moving the bulldozer into the load for loading the bucket and the power used to raise the loaded bucket so that the total power required does not exceed the power available.

Further, in other applications such as downhill vehicle coasting the input and output are reversed so that now the turbine drives the impeller to provide engine braking. The opposed heads developed by the turbines and impellers of prior art torque converters and fluid couplings prevented such devices from developing the high engine braking desired.

BRIEF DESCRIPTION OF THE PRESENT INVENTION

The hydrokinetic device of the present invention overcomes the foregoing disadvantages, and comprises a fluid containing housing, and wheel means, including an impeller wheel and a turbine wheel, and in the torque converter embodiments a stator wheel, and means for draining and filling the housing, for providing: hydraulic neutral simply by nearly voiding the housing, variable power capacity by varying the fluid level in the housing, and superior engine braking through the use of complimentary positive head wheels. The wheel means is sized and arranged so that the potentially destructive counter-flow is avoided and has the exit edge of one of the wheels spaced a distance apart from the entrance edge of another of the wheels, generally this distance being equal to or greater than the maximum width of one wheel, and has the wheels asymetrically shaped so that there is little or no centrifugal counter head developed to oppose the normal direction of impeller flow in the device. The wheel means of the device of the present invention have, preferably, a conical configuration, such as described in Harold L. Cottrell's U.S. Pat. Nos. 3,455,110, 3,613,366 and 3,751,922, and fixed pitch blading.

One object of the present invention is to provide a hydrokinetic device capable of operating at full or almost empty fluid levels without harm.

Another object of the present invention is to provide such a device with provisions for a hydraulic neutral that may be rapidly obtained.

Another object of the present invention is to provide such a device with a variable power absorbing capacity.

Yet another object of the present invention is to provide such a device with a variable power transmitting capacity.

Yet another object of the present invention is to provide such a device having wheel means producing little or no counter fluid flow.

Still another object of the present invention is to provide such a device having one wheel means spaced a distance apart from the adjacent wheel means for preventing counter flow.

Still another object of the present invention is to provide such a device having conical wheel means.

Yet still another object of the present invention is to provide such a device suitable for vehicular applications and having superior engine braking.

These and other objects of the present invention will become apparent from the accompanying figures of the drawings and the following written description.

DESCRIPTION OF THE PREFERRED EMBODIMENTS

Figure 1:
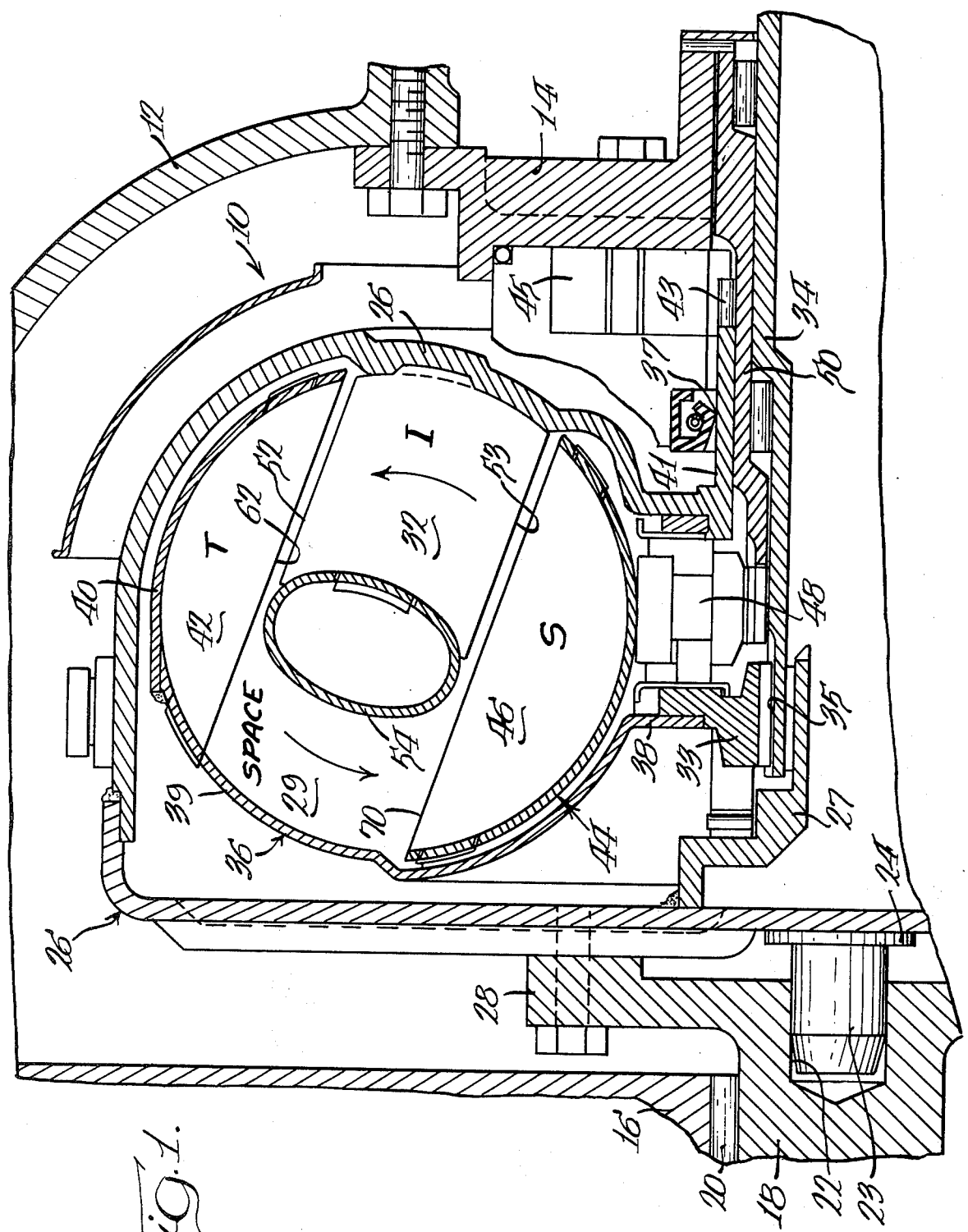
FIG. 1 is a fragmentary cross-sectional view of one embodiment of hydrokinetic device of the present invention of the torque converter type.

Referring to FIG. 1, a hydrokinetic device of the present invention, a torque converter 10 particularly suited for automotive use, is shown, and fits within a bell housing 12 extending from a transmission case 14. The bell housing itself is secured as by bolting to an engine block 16. The engine has a drive shaft 18 which is mounted in a bearing 20, the shaft 18 having a pilot opening 22.

The torque converter 10 has an input shaft 24 with a pilot 23 which is received in the pilot opening 22 and driven by the shaft 18. The input shell 26 has an inwardly protruding flange 27 which journal supports the output shaft 34. The output shell 36 is joined to flange 33 and is splined at 35 to mate with the output shaft 34. The input shell 26 is secured as by bolts to a flange 28 on shaft 18. The input shell 26 extends radially outwardly from the input pilot 23 and then curves to form a closed toroidal shape. Finally, the impeller shell is sealed at 37 adjacent to a coaxial input shaft 41 which is provided with extension tangs 43 for purposes of driving the charge pump 45.

Impeller blades 32 extend inwardly toward the center of the torus, the blades also being indicated by the letter "I". The impeller shell 26 and blades 32 rotate with the engine drive shaft 18, and the blades I are hereinafter described.

The output shaft 34 is rotatably mounted in bearings and extends into the transmission case 14 to drive the transmission. A turbine wheel or shell 36 is secured to rotate with the shaft 34. The turbine shell 36 extends arcuately outside the boundary of the torus, as indicated at 38, and then is bent toward and forms a portion of the torus. One portion of the turbine shell, indicated at 39, forming the torus is completely devoid of blades, while another portion, indicated at 40, carries turbine means or blades 42, also indicated by the letter "T", and hereinafter more fully described. The input shaft 24 and output shaft 34 are not mechanically constrained but can rotate relative to one another.

The torque converter 10 has a stator wheel or shell 44 which carries stator means or blades 46, also indicated by the letter "S" and hereinafter described. The shell 44 forms the remainder of the torus and is mounted by a one way clutch 48 on a tubular shaft 50 extending into the transmission case. The tubular shaft 50 may be held stationary or may be coupled to parts of the transmission gearing to provide a hydraulic reverse should that feature be desired. The one way clutch 48 permits the stator blades 46 to free wheel at certain conditions so that the torque converter 10 may function in the manner of a fluid coupling without any torque multiplication. Up to this point, except for the brief reference to the impeller, turbine and stator means and remaining space in the torus, all that has been described is conventional.

The impeller means 32 comprises, preferably, a plurality of blades I arranged about the periphery of a portion of the impeller shell 26 and rotates with the engine shaft 18. Blade curvature may range from arcuate to non-arcuate, depending on requirement parameters. The blade I is generally rectangular as is apparent from its projected image in FIG. 1. The outer edge of the blade I is secured to the impeller shell 26, and the inner edge, in this instance, carries an inner torus member 54 which is hollow. The inner torus 54 is oval shaped in cross-section. The inclined upper and lower edges 52 and 53 of the blade I give the impeller means a conical configuration as is discussed in the previously mentioned H. L. Cottrell U.S. patents.

The turbine means 42 comprises, preferably, a plurality of blades T arranged about the periphery of the portion 40 of the turbine shell 36 which drives the transmission input shaft 34. The blade T is generally similar to a segment of a circle which has been curved somewhat, and when projected, as shown in FIG. 1, is viewed as a segment of a circle. The outer edge of the blade T is secured to the turbine shell 36 and the inner edge 62 is on one side adjacent the upper edge of the impeller I, the other side extending into the space 29. The inclined inner edges 62 of the blades T give the turbine means a conical configuration.

The stator means 44 comprises, preferably, a plurality of blades S arranged about the periphery of the stator shell 44 and is generally held stationary by the one way clutch 48 during the torque multiplication range, but can freely rotate in one direction past the clutch point (except off-road equipment which usually does not use a one way clutch). The blade S is similar to the blade T in that it has the same general shape and a similar projected appearance, i.e., a segment of a circle. The inner edge of the blade S is secured to the stator shell and the outer edge 70 is on one side adjacent the lower edge of the impeller and on the other side opposite the spaced apart edge 62 of the blade T in the space 29.

As shown in FIG. 1, for the converter 10, the impeller I is of the same length as the space (length being generally defined as the distance of the blade along the normal flow path), but the impeller I is generally wider (width being defined as the distance of the blade perpendicular to the normal flow path) than the space, and generally about twice the width of the space. The impeller I has a maximum width about 2 to 3 times that of the stator S or turbine T, while the length of the stator S and turbine T is generally about twice that of the impeller I or the space.

Figure 6:
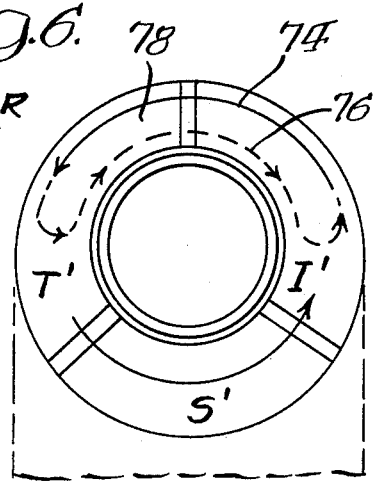
FIG. 6 is a fragmentary cross-sectional view of a prior art hydrokinetic device of the torque converter type.

In a typical prior art torque converter, such as shown in FIG. 6, the impeller and turbine means were symetrical. While the normal flow in the prior art device is counter-clockwise, as indicated by the solid arrow 74 from the impeller I', to the turbine T', to the stator S' and back to the impeller I', with partial fill a reverse or counter flow developed, as indicated by the dashed arrows 76. This counter flow and counter head are produced by the rotation of the turbine blade T', particularly the upper portion thereof, indicated at 78. The turbine counter head opposed the normal head developed by the impeller due to its rotation. This undesirable counter flow caused destructive surge forces, prevented operation of the prior art hydrokinetic devices at partial fill conditions and prevented such device from being quickly emptied or filled. Thus, the much desired features of hydraulic neutral and variable power capacity were from a practical standpoint unobtainable.

In the present invention, generally no counter head is developed by the turbine due to its position in the flow circuit and due to the large space in the counter head area. Instead the head developed by the turbine is in the same direction as, and is added to, the head developed by the impeller, the normal flow being from impeller I to turbine T, across the unoccupied space 29 (devoid of blades) in the flow circuit, then to stator S, and back to the impeller I. These results are achieved by positioning the turbine in the flow circuit so that it develops a positive head instead of the usual counter head. To help achieve this a large bladeless space 29 has been provided in the flow path between two consecutive members, as represented in the cross sectional area of FIG. 1. Generally 50% to 95% of this torus area is occupied by blading whereas the bladeless space in the counter head area may range from fifty to a hundred percent. Thus, the blade means rotate through 50% to 95% of the toroidal space, while the remaining 50% to 5% of the toroidal space is void of blades. Therefore, the hydrokinetic device of the present invention is capable of operating at partial fluid fill levels and of being filled or nearly emptied very rapidly without developing destructive shock loads thereby providing hydraulic neutral and variable power capacity.

While the impeller 32 of the present device is not as long as the prior art impeller, it is wider so that the power transmitting capacity is competitive to that of prior devices, especially when coupled to the turbine blade developing a non-opposing head. The stator blade 46 is similarly located as the prior art stator.

Figure 2:
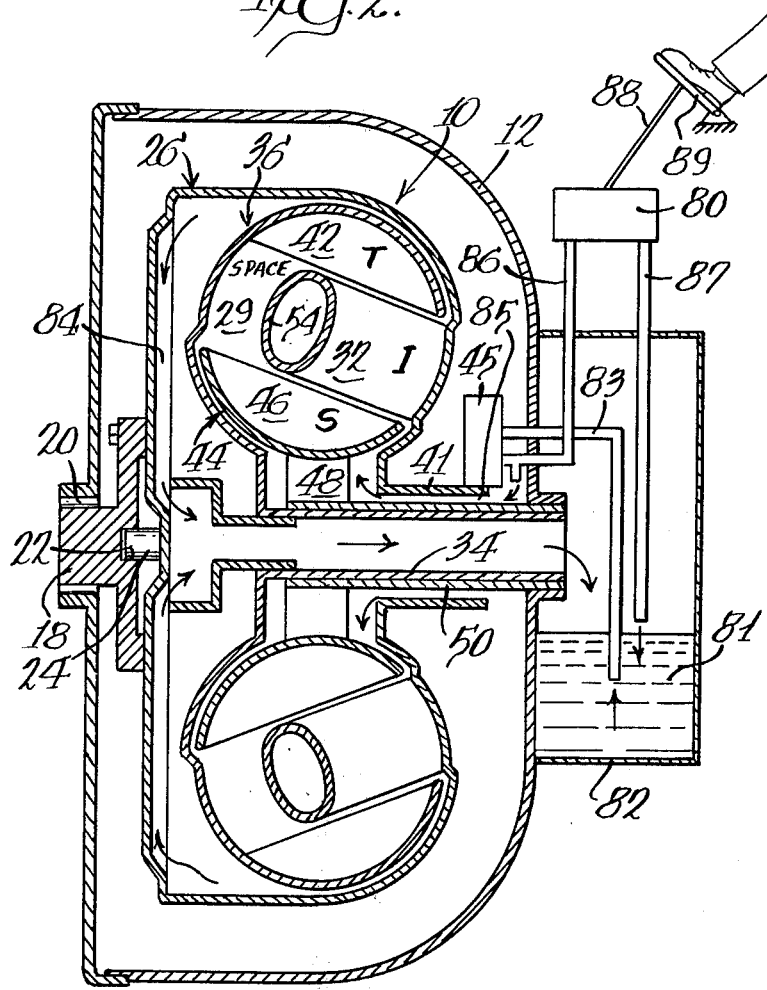
FIG. 2 is a schematic diagram of the device of FIG. 1.

Referring to the schematic of FIG. 2, means for draining or emptying and filling the hydrokinetic device 10 comprises a supply system having a control unit or modulator 80, a pump 45 (also shown in FIG. 1), and a reservoir 81 (in the gear box 82) connected to the pump intake by a line 82 and a return system, the line 84 (partially located in hollow shaft 34), for returning fluid to the reservoir, which is usually located in the bottom part of the transmission case. The pump discharge is connected to a line 85 which supplies fluid to the converter 10. The line 85 has a branch 86 connected to the modulator 80, the modulator having a return line 87 for returning fluid to the reservoir 81. In vehicular application, the control unit 80 may be connected by various means, such as the linkage 88 connected to the throttle pedal 89 of the vehicle, so that emptying of fluid from the impeller shell 26 (voiding the shell of fluid) may be controlled by the vehicle operator, through the conventional accelerator pedal.

Normally the fluid flows from the reservoir 81 to the pump 45 and into the converter 10 and back to the reservoir.

When neutral or increased horsepower is desired, depressing the pedal 89 causes the control unit 80 to open and permit some of the fluid discharged from the pump 45 to flow through the lines 86 and 87, while fluid is permitted to empty from the converter 10 at its usual rate through the line 84 to reservoir 81, thus, voiding the converter 10. As an alternative, the draining could be accomplished by pumping the fluid from the impeller shell or the control accomplished by connecting the suction side of pump to the drain line instead of the supply line.

At neutral, about 98% of the fluid is emptied from the torus portion of the device, leaving enough for lubrication purposes. In this state, almost no power is transferred between the impeller and turbine or vice versa.

At variable power capacity the percentage of fluid entering the torus portion is reduced. When the torque converter is operated at partially filled condition, it permits the prime mover to deliver more horsepower to the impeller, as compared to a fully filled condition.

With the output speed of the turbine shaft 34 other than zero, the increased input power results in a higher output torque delivered by the turbine, and the torque is consequently also higher over a broader range of operation than would normally be developed at a full fluid level.

Figure 3:
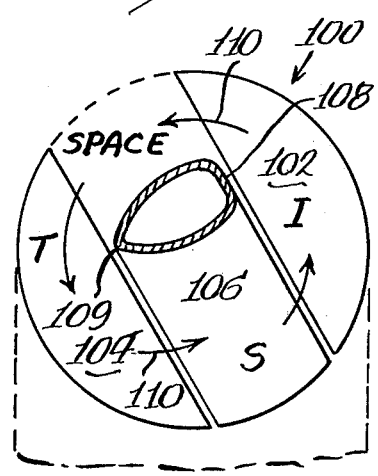
FIG. 3 is a fragmentary cross-sectional view of a second embodiment of a hydrokinetic device of the present invention of the torque converter type.

Referring to FIG. 3, an alternative embodiment of hydrokinetic device 100 of the torque converter type is shown, the device is similar to that shown in FIG. 1, and comprises an impeller 102, a turbine 104 and a stator 106. A comparison between the device 100 and the device 10, previously described, shows that while the impeller, turbine and stator of the device 100 are still conical, the conical angle is greater that that for the device 10. Further, the blades are shifted counter-clockwise so that now the rectangular stator 106 is between the circular segmented impeller 102 and turbine 104. Now, the stator 106 is about twice the width of the unoccupied space and just about 1½ times wider than the turbine 104 and impeller 102; while the impeller and turbine are 2 to 3 times longer than the stator or space. In this instance, an inner torus member 108, somewhat egg shaped in cross-section with the sharper end 109 being pointed toward the turbine 104, is secured to the stator 106.

Again, the normal fluid flow is from the impeller, across the space to the turbine, the stator and back to the impeller, as indicated by the arrows 110. While there is some counter head developed due to rotation of the turbine which opposes the head developed due to the rotation of the impeller, it is much less than developed by the prior art device due to the unoccupied space and counter-clockwise shifting of turbine T. Therefore, the device 100 will obtain the hydraulic neutral and variable power capacity features over a restricted but usefull range.

Figure 4:
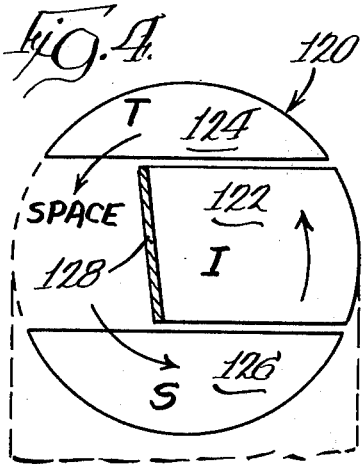
FIG. 4 is a fragmentary cross-sectional view of a third embodiment of a hydrokinetic device of the present invention of the torque converter type.

Referring to FIG. 4, another alternative embodiment of hydrokinetic device 120 of the torque converter type is shown, and comprises an impeller 122, a turbine 124 and a stator 126. The turbine, impeller and stator are cylindrical and not conical, but could easily be made conical by designing them to be inclined slightly to either side. This arrangement is very similar to that shown in FIG. 1, except cylindrical rather than conical blade parting edges are used. Another difference noted is that the device 120 has a flat, or nearly flat, annular inner member 128, which is linear in cross-section and is secured to the impeller. The general proportions of the impeller, turbine and stator are similar to those of device 10; of course the widths of the impeller and space between the turbine and stator are somewhat greater due to the reduced thickness of the flat inner member 128. This inner member 128 could just as easily have been vertical, rather than tipped or inclined to one side as shown, or could have been oval shaped. This type torque converter is particularly well suited for low cost equipment. If the device 120 had a locked stator (no one way clutch connecting the stator to the transmission), the device could be operated beyond the clutch point with a higher efficiency compared to conventional automotive torque converters with locked stators.

Figure 5:
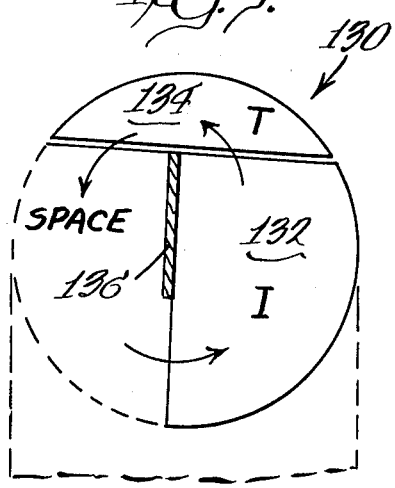
FIG. 5 is a fragmentary cross-sectional view of a fourth embodiment of a hydrokinetic device of the present invention of the fluid coupling type.

Referring to FIG. 5, yet another alternative embodiment of hydrokinetic device 130 of the fluid coupling type is shown, and comprises an impeller 132, a turbine 134, and a void or unoccupied space. The device 130 had blades of a conical configuration, but blades of a cylindrical configuration could just as easily be used.

The impeller 132 is located in the lower right hand quadrant; the turbine 134 is located above the impeller and is similarly shaped as the turbine 124 of device 120. In this instance, the space, which is devoid of blades, in the lower left quadrant separates the impeller 132 and turbine 134 to prevent development of counter heads or flow. The impeller 132, again, carries an inner member 136 similar to that of device 120. The impeller 132 is from 1 to 2 times the width of the space, and about 3 times the width of the turbine 134. The lengths of the turbine 134, impeller 132 and unoccupied space are generally about equal. Again due to the void or unoccupied space and the positive head turbine placement no counter head is developed so the device 130 may be quickly filled and emptied to achieve hydraulic neutral or variable capacity in applications not possible with conventional couplings.

While the hydrokinetic devices described of the present invention have torus configurations which are circular in cross-section, it is appreciated that other shaped cross-sections, such as oval or rectangular, etc., could easily be used. Further, while the devices described have been particularly adapted to vehicular use, it is appreciated that the device of the present invention can be adapted to marine, stationary or railway uses. Other blade designs could be used as long as the impeller and turbine are designed to prevent counter pumping and there is a space or void provided in that area of the torus which would tend to cause a counter head.

While only several embodiments of the hydrokinetic device of the present invention have been shown and described, it should be understood that modifications and variations could be made and equivalent structures substituted and that such forms would still fall within the scope of the invention as set forth in the following claims.

What is claimed is:

1. A hydrokinetic device comprising a fluid containing housing, impeller blade means located in said fluid containing housing for always effecting fluid flow in one direction and adapted to be connected to an input shaft, turbine blade means located in said fluid containing housing for effecting fluid flow in the same one direction and adapted to be connected to an output shaft, both of said blade means being adapted to rotate relative to one another, when rotated said impeller blade means developing a head in said one direction and said turbine blade means developing a head substantially unopposing the head developed by said impeller blade means, and means for emptying and filling said fluid containing housing while said blade means are rotated for varying the amount of fluid operated on by said blade means, whereby the device has a power capacity alterable by varying the amount of fluid operated on by said blade means.

2. A device as in claim 1, wherein one of said blade means is mounted on said fluid containing housing, and said fluid containing housing is adapted to rotate relative to said other blade means.

3. A device as in claim 1, wherein said blade means are located in a toroidal space, said blade means rotating through generally 50% to 95% of said toroidal space, the remainder of said toroidal space being unoccupied space.

4. A device as in claim 3, wherein both of said blade means have fluid entrances and exits, said fluid entrance of one of said blade means being located across said unoccupied space from said fluid exit of the other of said blade means.

5. A device as in claim 4, further comprising an inner annular member around which said fluid flows in said one direction.

6. A device as in claim 5, wherein said inner annular member is carried by one of said blade means.

7. A device as in claim 5, wherein said inner member is linear in cross-section.

8. A device as in claim 5, wherein said inner annular member is toroidal.

9. A device as in claim 1, wherein at least one of said blade means is conical in configuration.

10. A device as in claim 1, wherein all of said blade means are conical in configuration.

11. A device as in claim 1, wherein at least one of said blade means is cylindrical in configuration.

12. A device as in claim 1, further comprising stator blade means located in said fluid containing body and adapted to be held relatively stationary to said impeller and turbine blade means.

13. A device as in claim 12, wherein said blade means are located in a toroidal space, said blade means rotating through generally 50% to 95% of said toroidal space, the remainder of said toroidal space being unoccupied space.

14. A hydrokinetic device comprising a fluid containing housing, impeller blade means located in said fluid containing housing for always effecting fluid flow in one direction and adapted to be connected to an input shaft, turbine blade means located in said fluid containing housing for effecting fluid flow in the same one direction and adapted to be connected to an output shaft, both of said blade means being adapted to rotate relative to one another, when rotated said impeller blade means developing a head in said one direction and said turbine blade means developing a head substantially unopposing the head developed by said impeller blade means, stator blade means located in said fluid containing body and adapted to be held relatively stationary to said impeller and turbine blade means, said blade means being located in a toroidal space, said blade means rotating through generally 50% to 95% of said toroidal space, the remainder of said toroidal space being unoccupied space, and means for emptying and filling said fluid containing housing while said impeller and turbine blade means are rotated for varying the amount of fluid operated on by said blade means, one of said blade means being located between the other two of said blade means, said one blade means extending on one side from the periphery of said toroidal space, the other side of said one blade means terminating before reaching the periphery of said toroidal space, whereby the device has a power capacity alterable by varying the amount of fluid operated on by said blade means.

15. A device as in claim 14, wherein said one blade means carries an inner annular member on its other side around which the fluid flows in said one direction.

16. A hydrokinetic device comprising a fluid containing housing, impeller blade means located in said fluid containing housing for always effecting fluid flow in one direction and adapted to be connected to an input shaft, turbine blade means located in said fluid containing housing for effecting fluid flow in the same one direction and adapted to be connected to an output shaft, both of said blade means being adapted to rotate relative to one another, when rotated said impeller blade means developing a head in said one direction and said turbine blade means developing a head substantially unopposing the head developed by said impeller blade means, stator blade means located in said fluid containing body and adapted to be held relatively stationary to said impeller and turbine blade means, said blade means being located in a toroidal space, said blade means rotating through generally 50% to 95% of said toroidal space, the remainder of said toroidal space being unoccupied space, and means for emptying and filling said fluid containing housing while said impeller and turbine blade means are rotated for varying the amount of fluid operated on by said blade means, one of said blade means having a width about one to two times the width of said unoccupied space and generally about twice that of either of said other two blade means, said one blade means having a length generally one half to one times that of the length of either of said other two blade means and generally equal to the length of said unoccupied space, whereby the device has a power capacity alterable by varying the amount of fluid operated on by said blade means.

17. A hydrokinetic device comprising a fluid containing housing, impeller blade means located in said fluid containing housing for always effecting fluid flow in one direction and adapted to be connected to an input shaft, turbine blade means located in said fluid containing housing for effecting fluid flow in the same one direction and adapted to be connected to an output shaft, both of said blade means being adapted to rotate relative to one another, when rotated said impeller blade means developing a head in said one direction and said turbine blade means developing a head substantially unopposing the head developed by said impeller blade means, stator blade means located in said fluid containing body and adapted to be held relatively stationary to said impeller and turbine blade means, said blade means being located in a toroidal space, said blade means rotating through generally 50% to 95% of said toroidal space, the remainder of said toroidal space being unoccupied space, and means for emptying and filling said fluid containing housing while said impeller and turbine blade means are rotated for varying the amount of fluid operated on by said blade means, said impeller blade means being generally located in half of said toroidal space, and said unoccupied space being generally formed in the opposite half of said toroidal space, whereby opposing counter heads opposite to the head of the impeller blade means are avoided, and the device has a power capacity alterable by varying the amount of fluid operated on by said blade means.

18. A device as in claim 13, wherein said toroidal space is generally circular in cross-section.

19. A hydrokinetic device comprising a fluid containing housing, impeller blade means located in said fluid containing housing for always effecting fluid flow in one direction and adapted to be connected to an input shaft, turbine blade means located in said fluid containing housing for effecting fluid flow in the same one direction and adapted to be connected to an output shaft, both of said blade means being adapted to rotate relative to one another, when rotated said impeller blade means developing a head in said one direction and said turbine blade means developing a head substantially unopposing the head developed by said impeller blade means, stator blade means, all of said blade means rotating in a toroidal space having an arcuate cross-section, one of said blade means being generally rectangular and located between the other two blade means, each of said other two blade means being generally arcuate on one side and generally linear on its opposite side, said linear sides being adjacent for portions of their lengths to said one blade means, the remainder of the cross-section of said toroidal space being unoccupied space, said unoccupied space being located between the other portions of said linear sides of said two other blade means, and means for emptying and filling said fluid containing housing while said impeller and turbine blade means are rotated for varying the amount of fluid operated on by said blade means, whereby the device has a power capacity alterable by varying the amount of fluid operated on by said blade means.

20. A device as in claim 19, wherein said one blade means is said impeller blade means.

21. A device as in claim 19, wherein said one blade means is said stator blade means.

22. A device as in claim 19, further comprising an inner annular member around which said fluid flows in said one direction, said inner member being secured to said one blade means.

23. A device as in claim 19, wherein said blade means are conical in configuration.

24. A device as in claim 1, wherein said means for emptying and filling nearly empties said fluid from said housing for providing hydraulic neutral.

25. A device as in claim 1, further comprising stator blade means, and wherein said means for emptying and filling varies the amount of fluid operated on by said blade means for providing a variable power absorbing capacity to said device.

26. A device as in claim 1, further comprising stator blade means, and wherein said means for emptying and filling varies the amount of fluid operated on by said blade means for providing a variable power transmitting capacity to said device.

27. A device as in claim 1, wherein said means for emptying and filling comprises a pump for moving the fluid, a reservoir for storing the fluid, and a control means for regulating the fluid flow between the reservoir and fluid containing housing.

28. A device as in claim 1, wherein said blade means are located in a toroidal space, said blade means occupying generally 50% to 95% of said toroidal space, the remainder of said toroidal space being unoccupied space.

* * * * *